June 4, 1968 H. SIEGEL ET AL 3,387,094
CALL NUMBER INDICATING CIRCUITS
Filed Dec. 30, 1964
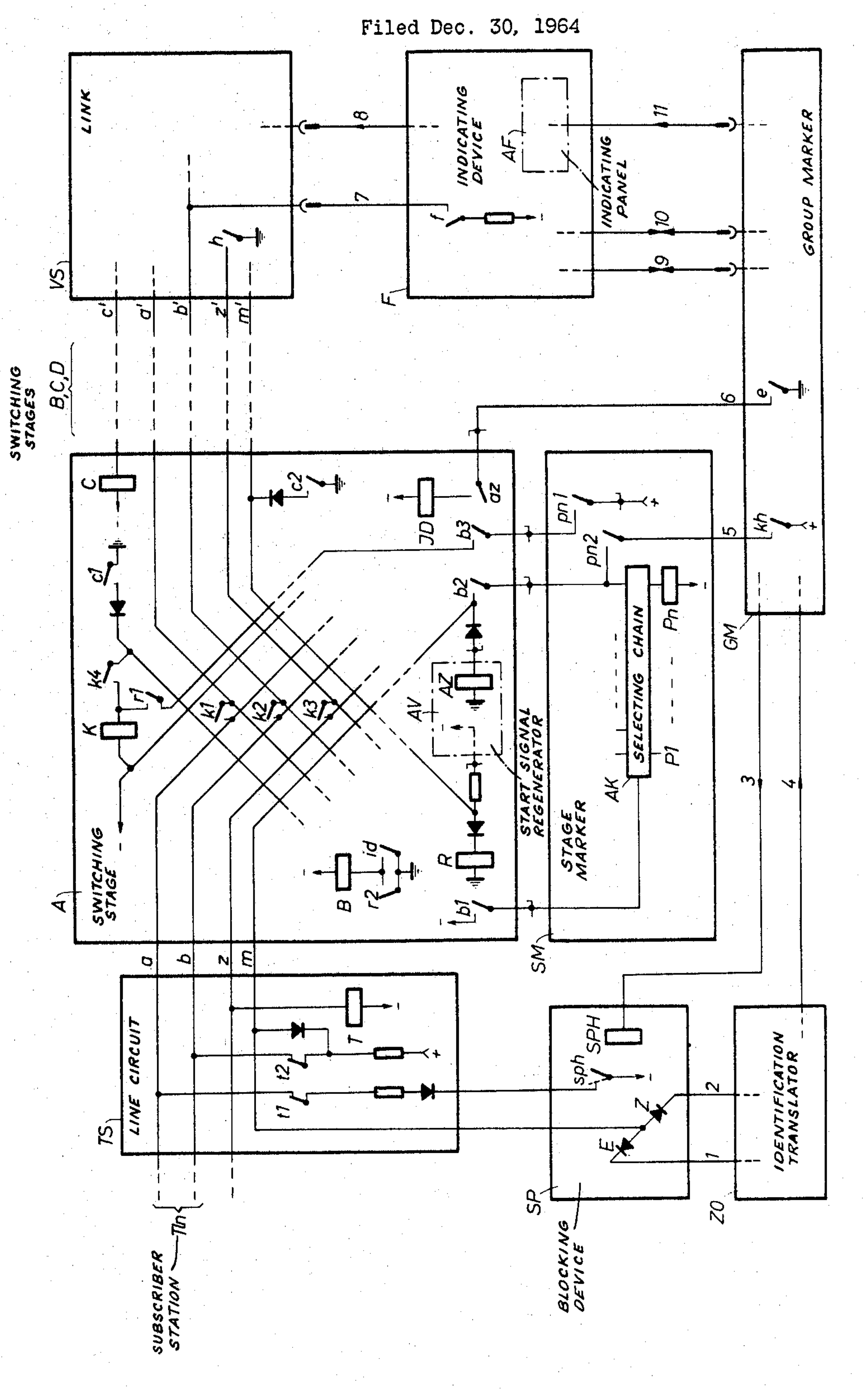

3,387,094
Patented June 4, 1968

3,387,094

CALL NUMBER INDICATING CIRCUITS

Herbert Siegel and Heinz Bubber, Munchingen, Germany, assignors to International Standard Electric Corporation, New York, N.Y., a corporation of Delaware Filed Dec. 30, 1964, Ser. No. 422,118
Claims priority, application Germany, Jan. 9, 1964, St 21,535
5 Claims. (Cl. 179—18)

The invention relates to call number indicating circuits and particularly for indicating the call number of subscriber stations in telephone exchanges in which connections are established through several switching stages by means of markers according to the guide-wire method and in which a stage marker connected to the first switching stage marks the initiating subscriber circuit.

If a subscriber lifts the handset but does not dial he normally blocks certain facilities of the exchange system. Similarly, if the calling subscriber does not restore the handset at the end of a conversation he blocks himself as a called subscriber. Such blockages causes an alarm in the exchange facility after the predetermined time. The attending personnel must be able to identify the subscriber causing the blockage. The attending personnel may also want to identify this subscriber belonging to a certain connection for other reasons, e.g. after intercepting a connection or for observation only.

In exchange systems of the conventional type the subscriber connecting line can be found by an optical search of the connection established. This method, however, is not feasible in electronic and quasi-electronic exchanges because the switching position of the crosspoint elements, for example of a relay with reed contacts, cannot be readily observed.

The identification of subscriber lines for fee assessment by means of subscriber identification facilities is known. This identification is made, for example, by scanning the subscriber lines using a control signal transmitted via the speech wires of a telephone communication. Since such facilities are controlled by criteria gained from the exchange system at defined moments while a connection is going to be established, such criteria cannot be simply used to identify a subscriber line by the attending personnel.

An object of the invention is to provide new and unique call number indicating circuitry.

A further object of the invention is to provide circuitry whereby attending personnel can identify the calling number at any arbitrary moment during a connection, when the connection is established through several switching stages by means of markers according to the guide wire principle and in which the stage marker connected to the first switching stage marks the subscriber line having started the call.

This is achieved according to the invention by an indicating device connected to the group markers and to one of several connecting links that are connected with the outputs of the final switching stage. This indicating device influences the subscriber circuit searched for through the wires of the connection established in such a way that establishing of a call is initiated conventionally. The indicating device actuates the group marker to prevent seizing by other subscribers. The indicating device imitates the conventional control signal led back through the guide wire and thereby effects the connection of the stage marker to the first switching stage. After the identification of the subscriber circuit searched for by the stage marker, a control signal is forwarded to a translator via said subscriber circuit which thereby transmits the subscriber number searched for and displays that number in the indicating device. An advantage of the invention is that already existing exchange facilities can be used in common for the above purpose so that the additional expenditure is minimized.

The above mentioned and other features of this invention and the manner of obtaining them will become more apparent, and the invention itself will be best understood by reference to the following description of an embodiment of the invention taken in conjunction with the accompanying drawings. The drawing indicates that a subscriber T*ln* can be connected in a way known per se with a link VS through its line circuit TS, via a switch block of a switching stage A and through further switching stages B, C, and D, according to the guide wire method. This guide wire method will be briefly explained below.

In order to connect a subscriber T*ln* with a link VS a start signal is applied to the guide wire on the input end of the switching stage A when the handset at the subscriber station is lifted. The start signal is extended through the crosspoints of switching stages A–D reaching the accessible outputs. On the output end one of the outputs, having been marked as accessible, is selected by a selecting device not shown on the drawing, connected with a link VS and marked with an access signal. The drawing shows, for simplicity reasons, only one switch block of the switching stage A with only one input, having the wires *a*, *b*, *z*, *m* and only one output with the wires *a'*, *b'*, *c'*, *z'*, *m'*. Similar processes occur in the switching stages B, C, D not shown on the drawing when the call is going to be established, as described for the switching stage A. The start signal appears as a negative potential on the wire *b*. It runs through a contact *t*2 of a disconnecting relay T inserted in the subscriber line circuit TS, via a diode, via the guide wire *m* and via another diode to start signal regenerator AV and causes a relay AZ to operate. The start signal regenerator renews the start signal and forwards it on all available guide wires, that is, also on the guide wire *m'* leading to the link VS. Thereupon ground potential is applied to the wire *c'* in the link VS, causing a relay C in the switch block of the switching stage A to respond, which relay prepares, by its contact *c*1, the holding circuit for a crosspoint relay K. Its contact *c*2 removes the negative start signal from wire *m'* to block any further seizing of link VS by grounding the guide wire *m'* through a diode. Moreover, positive potential is applied in the connecting link VS to the guide wire *m'* as an access signal, which causes a relay R in the switch block to respond.

Relay R initiates, with the aid of relay B (contacts *b*1, *b*2, *b*3), the connection of a stage marker SM with the switch block. This stage marker selects, when start signals appear on several guide wires, a defined guide wire through a selecting chain AK. Assuming a check relay P*n* has operated closing through its contact *pn*1 the starting circuit for the crosspoint relay K and applying through its contact *pn* 2 positive potential to an identification translator Z0 via contact *b*2, the wires *m*, the diodes E, Z in a blocking device SP to prevent false starting and via the wires 1, 2. The translator Z0 renders information on particularities of a connection, e.g. about detours or rights-of-way. The starting subscriber line circuit TS and consequently, the subscriber T*ln* is marked by the positive potential applied to the wire *m*.

After the removal of the stage marker SM from the switch block the crosspoint relay K is kept energized via the contacts *k*4, *c*1. The crosspoint relay K through connects the speech-wires with its contacts *k*1, *k*2 and connects through its contact *k*3 the wires Z, Z' whereby the ground potential, already preparatorily applied in the link through a contact *h*, reaches the disconnecting relay T.

Said relay T operates and interrupts energy supply from the subscriber circuit through its contacts *t*1, *t*2.

According to the invention, an indicating device F is now connectable to the link VS and to a group marker GM. This can be achieved in the example herein described by plugging leads 7 to 11 into jacks at the link VS and at the group marker GM. The connection can also be made automatically. With the aid of the indicating device F the subscriber T*ln* now connected with the link VS can be identified.

By pressing a key in the indicating device F, not shown on the drawing, the group marker GM is requested through the line 9, which group marker thereupon determines the line that initiated the call and transmits an access signal to the indicating device F via said line. Simultaneously, the group marker GM actuates through line 3 a relay SPH in the blocking device SP. This relay is used for the terminating traffic. Through its contact *sph* it prevents subscriber T*ln* from initiating any call and releases all other switch blocks of the switching stage A that operated upon a call initiation. When all start signal regenerators AV are in the non-operated position, the group marker GM closes contact *e* responsive to a control signal on line 10 and emitted from the indicating device F, thereby preparing the operating circuit for a relay JD provided in the switch block group marker GM then and sends back an acknowledging signal to the indicating device F through said line 10. A device F then initiates the actual identification process.

The identification process is initiated when device F transmits a control signal via the line 8 to the link VS, the control signal effects a short-time opening of the contact *h*. A simultaneous closing contact *f*, applies negative potential to the wire *b'*. After opening of contact *h* the disconnecting relay T drops and causes the negative potential, originating from the wire *b'*, to reach the start signal regenerator AV through contact *t*2 and the wire *m*. By this, the conventional process for establishing a connection is initiated. However, the offering signal cannot reach the link VS due to the blocking through contact *c*2. Consequently, no access signal can be returned from said link. The access signal is closely simulated by the ground potential reaching the relay JD through the contact *e* and through a contact *az* of the relay AZ. The relay JD responds and causes relay B to operate through its contact *jd*, whereupon said relay B starts the operation of the stage marker SM.

As already described, positive potential reaches the translator Z0 via the contacts *pn*2, *b*3, after the selecting process is completed. Said positive potential, however, is not derived from the stage marker SM, but from the group marker GM in that it is connected to stage marker SM due to a control signal transmitted via the line 10, through a contact *kh* and via a line 5.

In the subscriber circuit the disconnecting relay T is excited again and the starting circuit interrupted before the group marker GM forwards the positive potential on the wire *m*. Said positive potential reaches, via the subscriber line circuit TS, an identification matrix of the blocking device SP through the diodes E, Z and from said blocking device to the translator Z0, in which means respond to form the complete call number, said means not shown on the drawing. These means transmit a call number of the subscriber T*ln* to the group marker through a line 4 and from there to an indicating panel AF in the indicating device F through the line 11. After indication and storing of the call number the indicating device F again immediately releases the group marker GM.

The entire identification process needs only fractions of a second. To identify the call number the already existing switching elements are used to a far-reaching extent. Thus, only the additional relay JD is required in the switch blocks of the first switching stage A. In addition to this, there is required a relay KH in the group marker and the means to form the complete call number in the centralized translator Z0, if they are not so equipped for other reasons.

While the principles of the invention have been described above in connection with specific apparatus and applications, it is to be understood that this description is made only by way of example and not as a limitation on the scope of the invention.

We claim:

1. A circuit arrangement for indicating the call numbers of subscriber lines in telephone exchanges in which connections are established from said subscriber lines to available links through several switching stages by means of stage markers and group markers using control signals on guide wires, means responsive to an off-hook condition of a calling one of said subscriber lines for initiating a start signal, means for transmitting said start signal to said guide wires, start signal regenerating means in said switching stages for transmitting regenerated start signals to an available link and for seizing one of said stage markers, selecting chain means in said stage marker for selecting a designated one of said guide wires for marking said calling line circuit, crosspoint relay means operated responsive to the operation of said selecting chain for connecting said calling line circuit through said switching stages to said available link, means operated responsive to said cut-through for dropping said stage marker, means for connecting an indicating device between a group marker controlling the signals on the selected guide wire and the available link, means in said indicating device for causing the initiation of a start signal in order to reseize the stage marker, said initiation means comprising means for simulating the start signal transmitted initially, blocking means under the control of said indicating device for preventing the group marker from establishing a call through other subscriber lines, means responsive to the reseizing of said stage marker to one of said several switching stages for identifying the calling subscriber line comprising translator means for providing subscriber numbers and means responsive to the identification of the calling subscriber line by the stage marker for causing said translator to transmit the calling subscriber number to the indicating device.

2. A circuit arrangement according to claim 1 comprising subscriber circuits connected to each of said subscriber lines, disconnecting relay means in each of said subscriber circuits, means in said connected link for operating said disconnecting relay, means in said indicating device for dropping for a short time the disconnecting relay in the subscriber circuit connected to the calling subscriber line, and means for transmitting a starting potential to the guide wire through a speech wire and through a break-contact of said disconnecting relay.

3. A circuit arrangement according to claim 2 wherein separate switching means are provided on said first switching stage for reconnecting said stage marker to said first switch stage, and means for operating said separate switching means responsive to a start signal and a control signal of the indicating device passing through the group marker.

4. A circuit arrangement according to claim 3 wherein means are provided for transmitting a translator control signal from the stage marker to the translator through the guide wire of the calling subscriber circuit.

5. A circuit arrangement according to claim 4 wherein means are provided whereby said translator control signal from said stage marker is emitted responsive to another control signal from the indicating device forwarded through the group marker.

References Cited

UNITED STATES PATENTS 2,686,840 8/1954 Den Hertog.

WILLIAM C. COOPER, *Primary Examiner.*